United States Patent [19]

Sawade et al.

[11] Patent Number: 5,039,013
[45] Date of Patent: Aug. 13, 1991

[54] ROTATING NOZZLE APPARATUS

[75] Inventors: Eikan Sawade; Keiko Ojima, both of Tokyo, Japan

[73] Assignee: Anzen Motor Co., Ltd., Tokyo, Japan

[21] Appl. No.: 482,933

[22] Filed: Feb. 21, 1990

[30] Foreign Application Priority Data

Feb. 23, 1989 [JP] Japan .................................. 1-19606

[51] Int. Cl.$^5$ .............................................. B05B 3/06
[52] U.S. Cl. .................................... 239/256; 239/261; 239/265; 239/DIG. 1
[58] Field of Search .............. 239/227, 251, 256, 261, 239/264, 265, DIG. 1

[56] References Cited

U.S. PATENT DOCUMENTS

| | | | |
|---|---|---|---|
| 1,639,389 | 8/1927 | Todd | 239/251 X |
| 1,649,179 | 11/1927 | Orr | 239/251 X |
| 3,357,644 | 12/1967 | Penfield et al. | 239/261 X |
| 3,876,148 | 4/1975 | Cushing et al. | 239/227 |
| 3,921,912 | 11/1975 | Hayes | 239/DIG. 1 X |
| 4,747,544 | 5/1988 | Kränzle | 239/251 |

Primary Examiner—Andres Kashnikow
Assistant Examiner—William Grant
Attorney, Agent, or Firm—Foley & Lardner

[57] ABSTRACT

A rotating nozzle apparatus that is rotated by the reaction of highly pressurized water wherein, by rotating a nozzle attaching body 6 to vary the distance between a rectilinear propagation nozzle 7 and the rotation axis M of a support 5, the jet area of the rectilinear propagation nozzle which is rotated about the rotation axis of the support can be arbitrarily adjusted. A preferred embodiment comprises an apparatus wherein a rotation suppressing arrangement is positioned to be spaced a predetermined radial distance from the axis C of the nozzle attaching body, and the suppressing force of the rotation suppressing arrangement can be increased from the start where the suppressing force is substantially in the state of no applied load, proportionally to the increase of the rotational speed of the nozzle attaching body. In another embodiment a liquid outflow restrictor in the form of a labyrinth or a thread is interposed in the outlet opening adjacent the outer circumferential surface of a cover, and the fitted surface of the cover is substantially sealed with leaked liquid present on the restrictor surface, so that if splashed muddy water formed by rebounding highly-pressurized water from the ground at a high speed hits the fitted surface, the splashed water is prevented from entering the fitted surface.

3 Claims, 7 Drawing Sheets

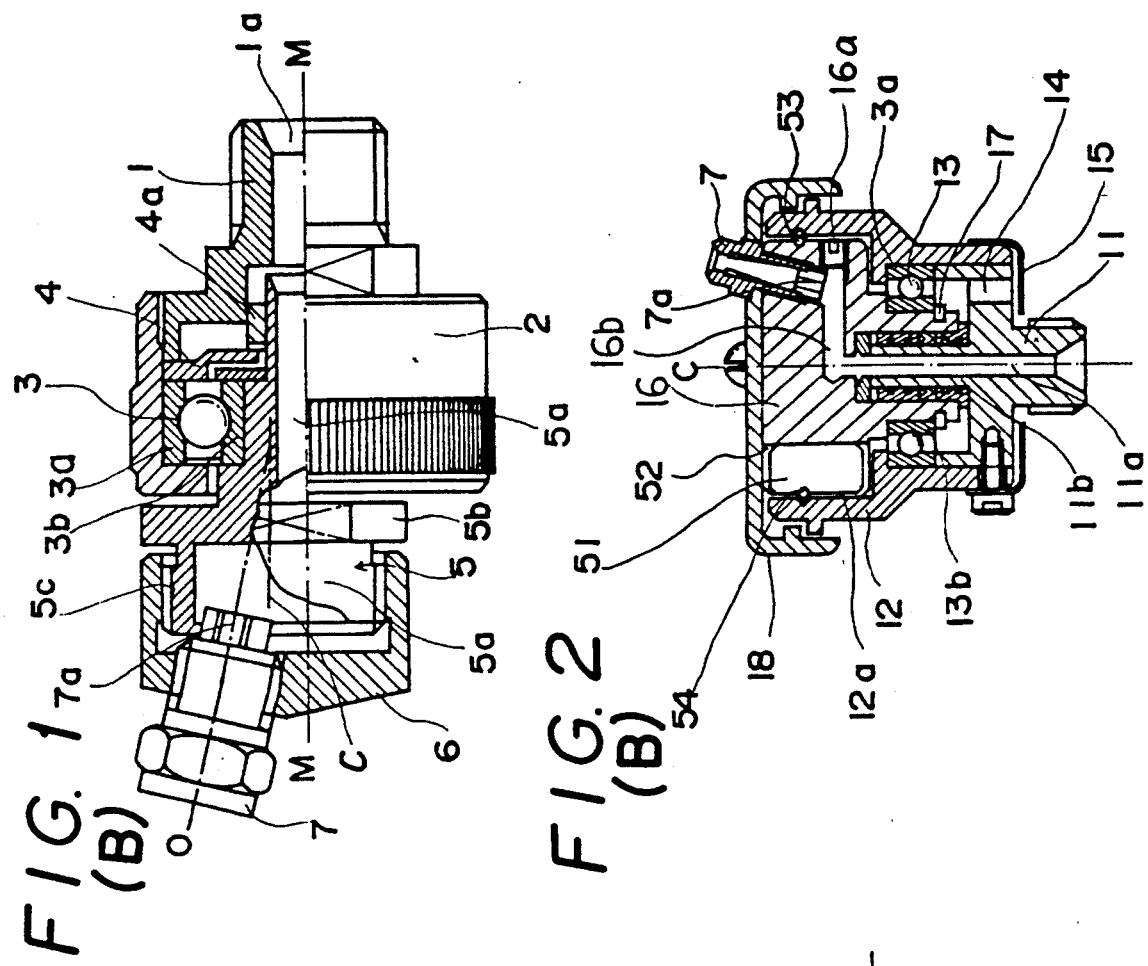
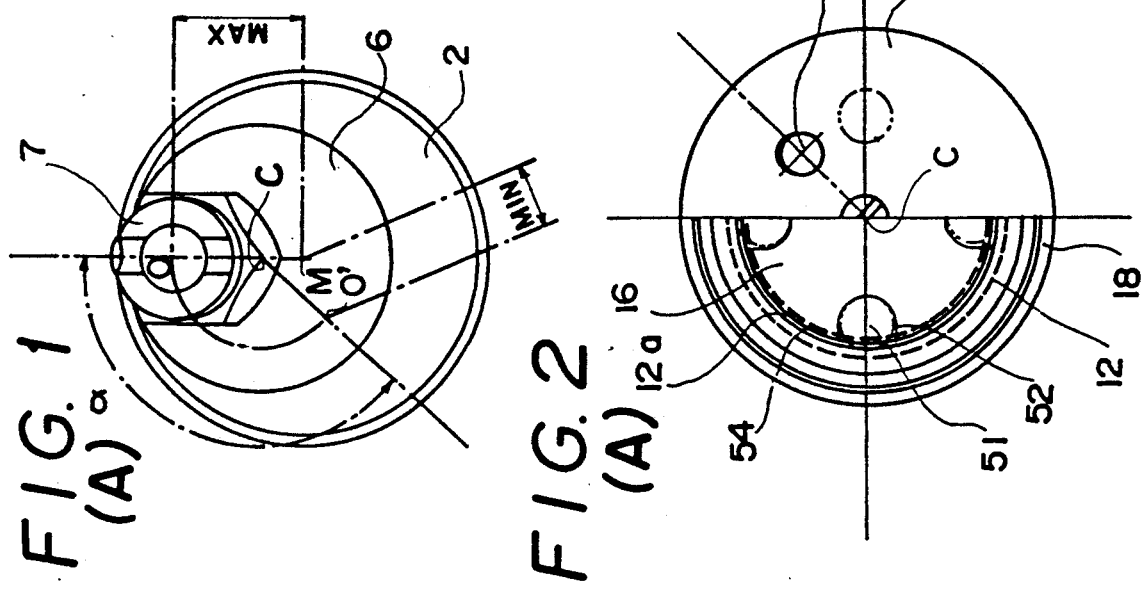

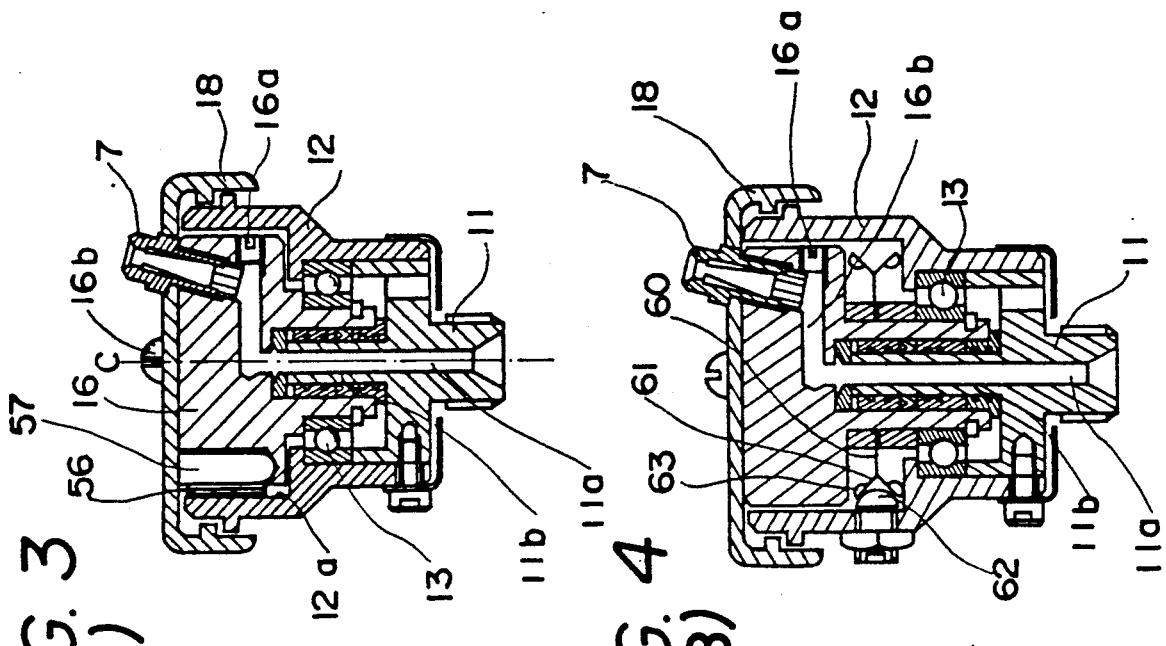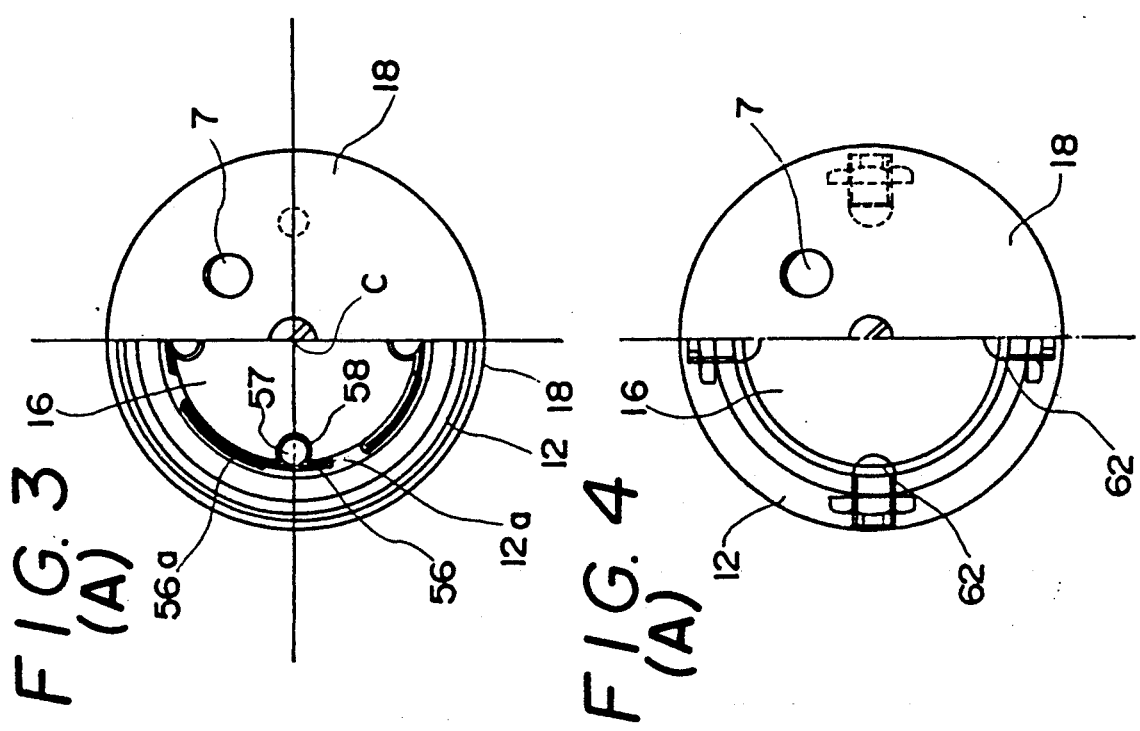

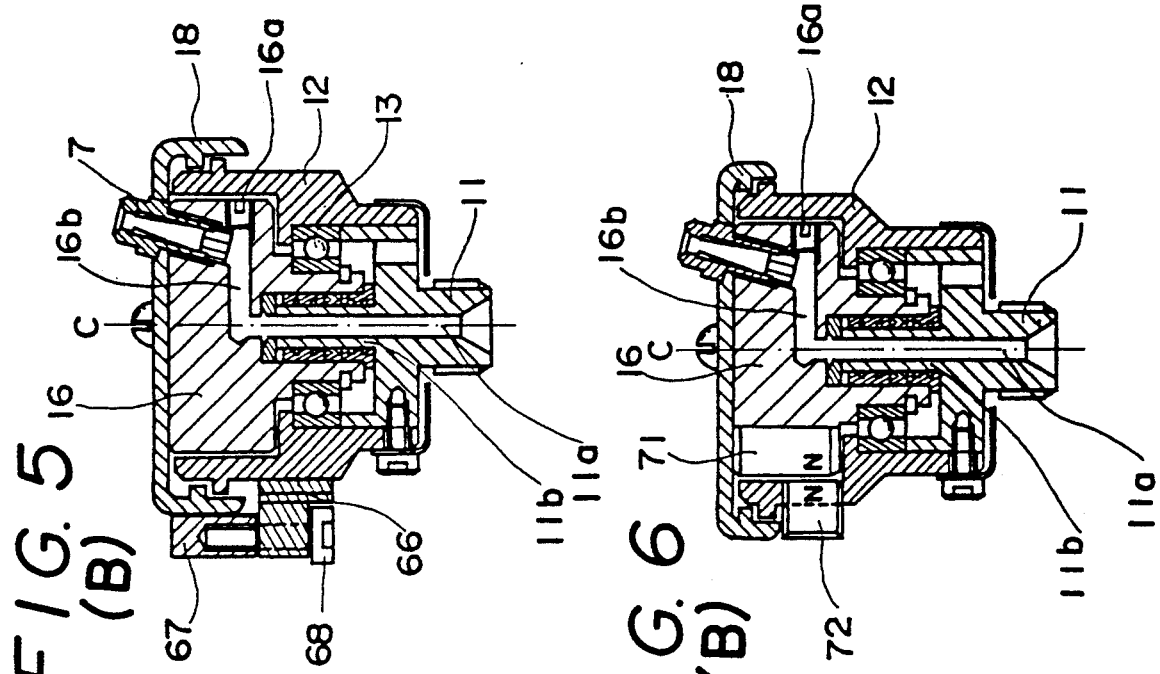
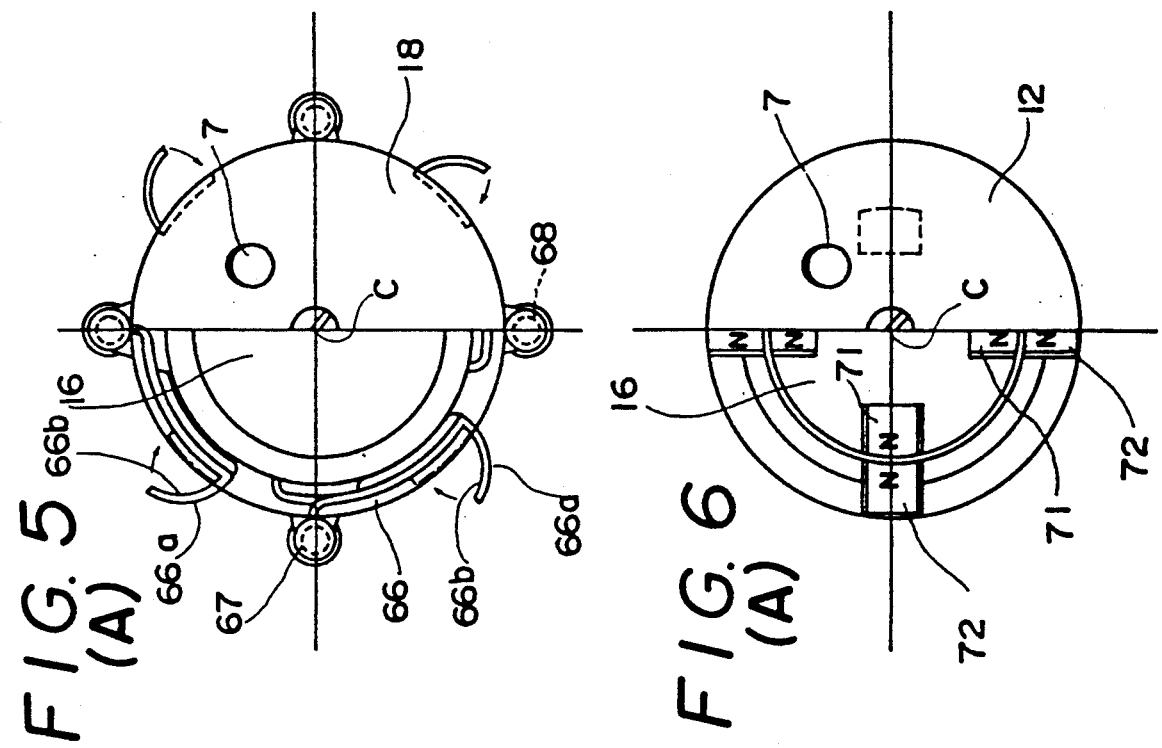

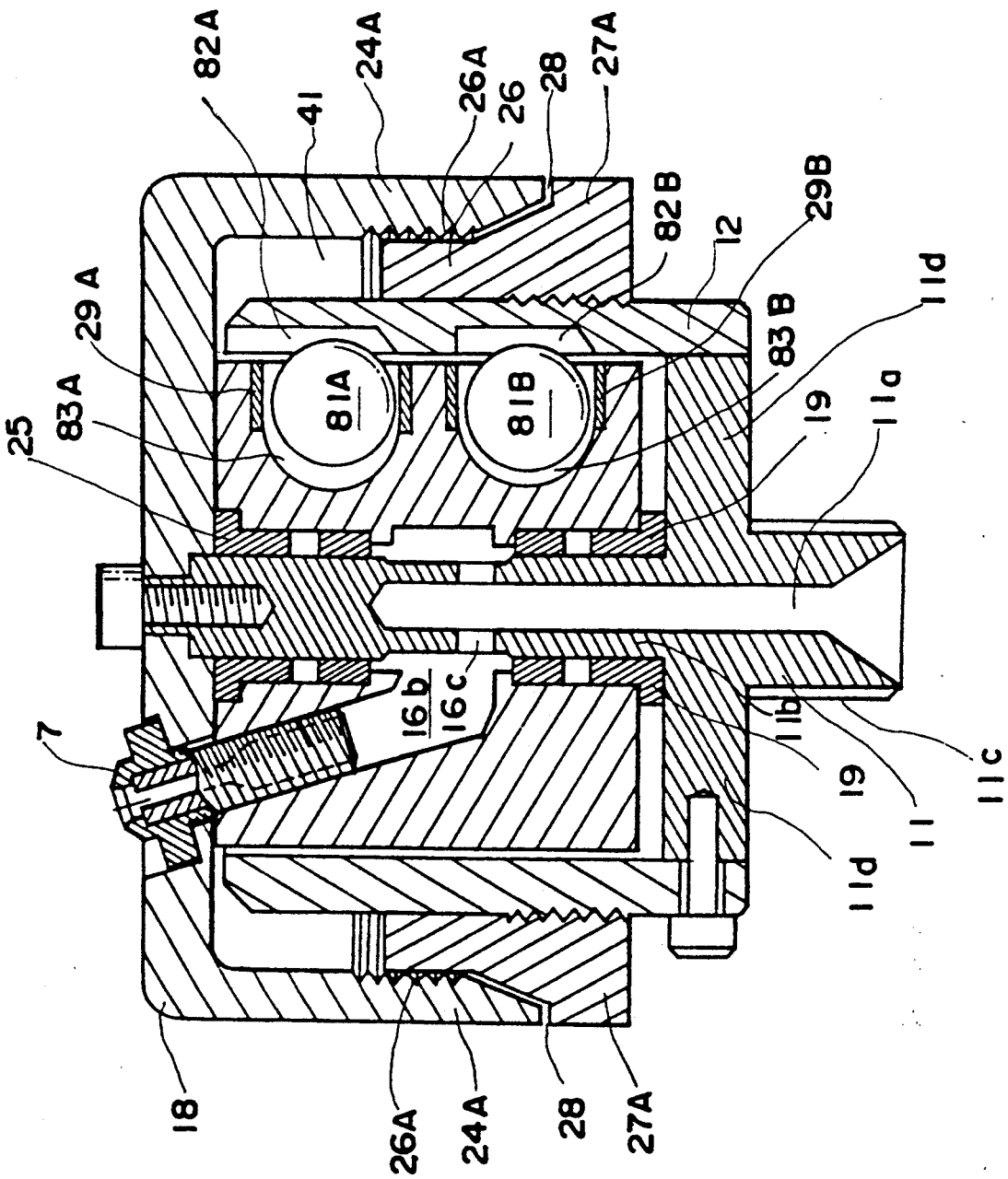

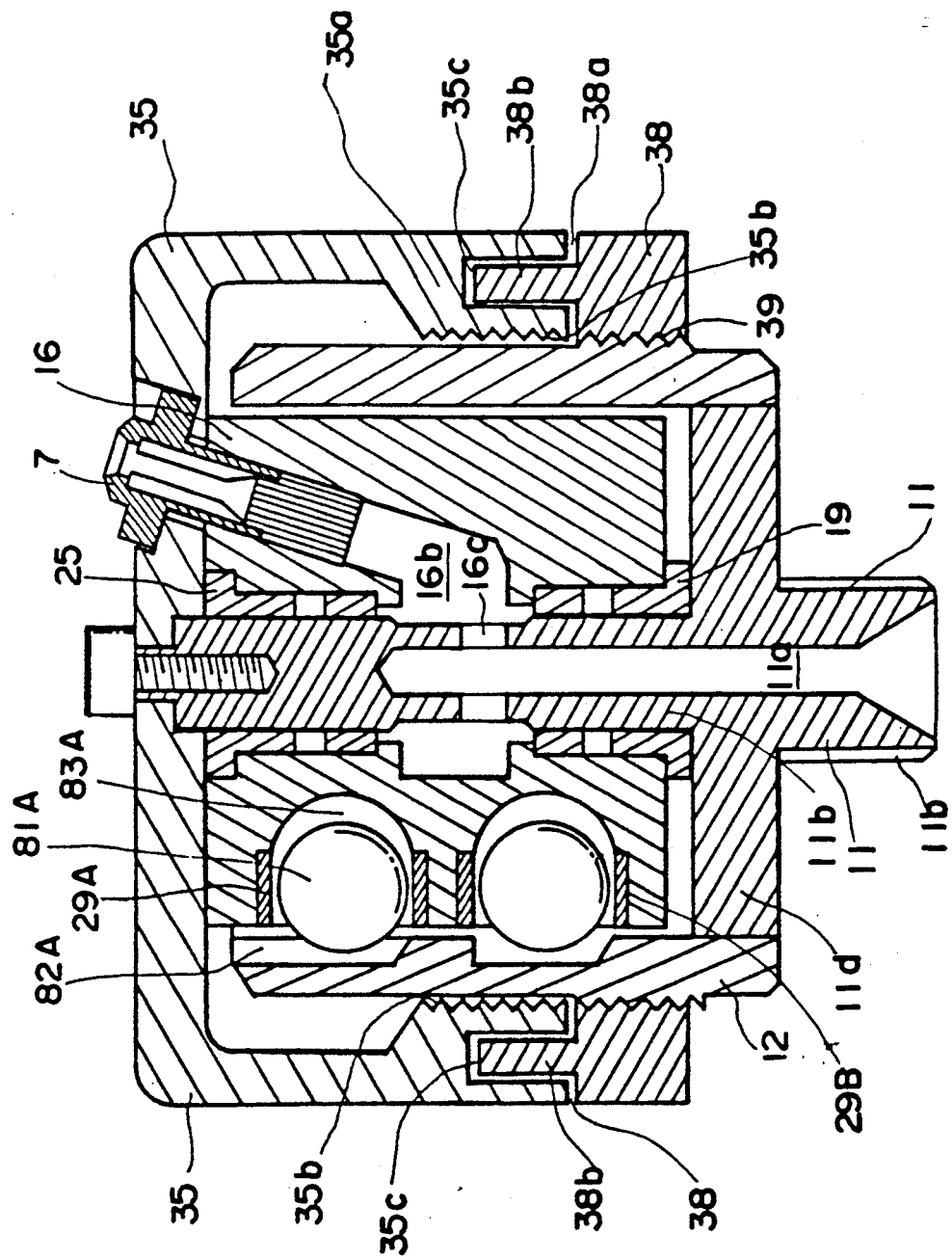

ROTATING NOZZLE APPARATUS

DETAILED DESCRIPTION OF THE INVENTION

1. Technical Field

The present invention relates to a rotating nozzle apparatus that can be rotated by the reaction of highly pressurized water, and in particular, a rotating nozzle apparatus for jetting high-pressure water for washing vehicles or the like.

2. Prior Art

Washing-apparatuses for jetting washing water from a jetting nozzle to remove soil adhered to the inner and outer surfaces of a vehicle are conventionally known, and in such apparatuses, in order to enhance the washing power, the jet pressure of washing water is increased and in addition a rectilinear propagation nozzle is used, so that the jet pressure per unit area is increased, but when such a constitution is employed, the washing area becomes inevitably small and the washing efficiency becomes unavoidably lowered.

Thus, a rotating nozzle apparatus is suggested wherein a jetting nozzle is attached to a rotatable support, the jet direction of the nozzle is swerved from the rotation axis of the support, and the reaction of the jet propulsion from the nozzle is used to rotate or swing the nozzle so that the jet area may be enlarged.

However, in such a rotating nozzle apparatus, since the rotational speed of the nozzle is determined depending on the jet pressure, the higher the jet pressure is made, the more the rotational speed is increased, while since the nozzle is swerved from the rotation axis, a centrifugal force is exerted normally to the rotation axis by the rotation of the nozzle, and the centrifugal force increases in proportion to the rotational speed.

The thus increased centrifugal force acts on the jet water stream jetted from the nozzle, so that not only the rectilinear propagation property of the jet water stream is prevented but also the rectilinear jet water stream is disturbed, bringing the jet water stream into the state of spray. Once the water stream is brought into the state of spray, the impact force of the water stream impinged on the vehicle with the jet speed retained drops greatly, resulting in a problem that the washing efficiency drops considerably.

To eliminate such a problem, it is possible to make the engagement of the nozzle with the support firm thereby suppressing the rotational force, but in that constitution the nozzle cannot be rotated smoothly in the initial stage after the starting, therefore such an operation is required that to rotate the nozzle forcibly, the nozzle jet pressure is set high enough to allow the nozzle to be rotated in the initial stage after the starting and then the nozzle pressure is returned to the steady pressure after the rotation of the nozzle, so that the control operation becomes complicated more than necessary, and the apparatus itself is required to have enough strength to withstand the high pressure in the initial stage after the starting, which requires to make the apparatus large.

SUMMARY OF THE INVENTION

An object of the present invention is to provide a rotating nozzle apparatus that has a simple structure and whose jet area can be arbitrarily adjusted.

Another object of the present invention is to provide a rotating nozzle apparatus wherein when highly pressurized water is jetted, the jet stream is not made into spray by the centrifugal force, and the rectilinear propagation property of the jet stream is retained.

Another object of the present invention is to provide a rotating nozzle apparatus wherein the nozzle can be rotated easily with the steady jet pressure retained even in the initial stage after the starting.

Still another object of the present invention is to provide a rotating nozzle apparatus that can secure smooth rotation and durability for a long period of time.

In order to attain the above technical objects, the present invention constitutes the following inventions.

That is, the invention suggests as shown in FIG. 1 (B) a rotating nozzle 7 apparatus comprising as constitutional elements:

(1) a support 5 supported rotatably onto a main body 1 connected to a pressure source,
(2) a nozzle attaching body 6 engaged with said support 5 rotatably along an axis C swerved from the rotation axis M of the support 5,
(3) rectilinear propagation nozzle 7 fixed to said attaching body, the nozzle 7 being inclined at a prescribed angle so that the jet pressure from the nozzle 7 allows the nozzle attaching body 6 to rotate about the rotation axis M of the support 5, and
(4) a means, for example, for allowing said nozzle attaching body 6 to engage with the support 5 through a screw section 5a so that the rotation resistance between the nozzle attaching body 6 and the support 5 may be set to such a degree that the position can be retained against the centrifugal force produced at the time when said nozzle attaching body 6 is rotated about the rotation axis M of said support 5.

According to the invention, since the rectilinear propagation nozzle 7 is constituted in such a manner that the rectilinear propagation nozzle 7 can be rotated along the axis α swerved from the rotation axis M of the support 5 through the nozzle attaching body 6, by rotating said nozzle attaching body 6 as shown in FIG. 1 (A), the distance between said rectilinear propagation nozzle 7 and the rotation axis M of the support 5 can be varied thereby the jet area of the rectilinear propagation nozzle 7 rotated about the rotation axis M of said support 5 can be arbitrarily adjusted.

Since the rotation resistance between the nozzle attaching body 6 and the support 5 is set to such a degree that the position can be retained against the centrifugal force produced at the time when said nozzle attaching body 6 is rotated about the rotation axis M of said support 5, and more particularly said nozzle attaching body 6 and the support 5 are rotatably supported through screw engagement, the rectilinear propagation nozzle 7 is not displaced or swung by the centrifugal force produced by the rotation of said support 5, and said jet area can accurately be retained positively.

When the distance between said rectilinear propagation nozzle 7 and the rotation axis M of the support 5 is varied, proportionally thereto the centrifugal force produced in said rectilinear propagation nozzle 7 can be varied, so that when the jet water stream is made into spray by the centrifugal force, by reducing the distance between the rotation axis M of said support 5 and the rectilinear propagation nozzle 7, the strength of the centrifugal force can be decreased to keep the rectilinear propagation property.

In this case, by providing a rectifying piece 7a on the inlet side of said rectilinear propagation nozzle 7, the rectilinear propagation property is further improved.

Further, by supporting said support 5 onto the main body 1 through a ball-and-roller bearing, the support 5 and the main body 1 can be supported through a surface, and the pressure resistance can be improved.

FIGS. 2 to 9 show the second invention and suggest a rotating nozzle 7 apparatus comprising as constitutional elements:

(1) a nozzle attaching body 16 supported rotatably to a main body 11 connected to a pressure source, (2) a rectilinear propagation nozzle 7 attached to said nozzle attaching body 16, said nozzle 7 being inclined at a prescribed angle with the axis C of said attaching body, and said nozzle attaching body 16 being rotatable by the jet pressure, and (3) rotation suppressing means 50 to 85 positioned at a prescribed distance radially from the axis C of said nozzle attaching body 16, and the suppressing force of said rotation suppressing means 50 to 85 being increasable from the start of substantially no applied load proportionally to the increase in the rotation speed of the nozzle attaching body 16, and thus a rotating nozzle apparatus can be provided wherein when highly pressurized washing water is jetted, the jet water stream is not made into spray by the centrifugal force, the rectilinear propagation property can be retained, and the nozzle can be rotated easily at a steady jet pressure even in the initial stage after the starting.

As said rotation suppressing means 50 to 85, various specific constitutions can be considered. For example, as shown in FIGS. 2 to 4, slides 51, 56, and 61-62 are interposed between said nozzle attaching body 16 and the main body 11. After the state wherein said slides 51, 56, and 61-62 retain a non-contact state between them and the slide surface of said nozzle attaching body 16 or the main body 11, the rotation of said nozzle attaching body 16 produces the frictional resistance of said slides 51, 56, and 61-62, so that the rotation of said attaching body 16 is suppressed, and said frictional resistance can be increased in proportion to the increase of the centrifugal force generated by the rotation of said nozzle attaching body 16.

Further, as shown in FIG. 5, it is also possible to constitute in such a way that said rotation suppressing means comprises blades 66 attached to the outer circumferential wall surface of the nozzle attaching body 16, and the pressure receiving area of said blades 66 is increased in proportion to the increase of the centrifugal force generated by the rotation of said nozzle attaching body 16.

Further, as shown in FIG. 6, it is also possible to constitute in such a way that the rotation suppressing means comprise magnet bodies 71-72 positioned between said nozzle attaching body 16 and the main body 11 and opposed to each other so that the repulsing magnetic field formed between said magnet bodies 71-72 may suppresses the rotational force of said nozzle attaching body 16.

Further, as shown in FIG. 9, it is also possible to form said rotation suppressing means comprising a ball 81 housed in a U-shaped hole 83 being formed in the outer circumferential surface of said nozzle attaching body 16, and an arcuate groove 82 partially grooved circumferentially on the inner wall surface of the main body positioned to face said U-shaped hole 83.

In this case, as shown in FIGS. 10 and 11, said ball is preferably possible to be made of a ceramic material, wherein since the ceramic material is lighter in weight than that of steel, it is possible to reduce steeply the impact energy produced at the time when the ball 81 collide with said arcuate groove 82 and said U-shape hole 83 resulting in keeping the nozzle attaching body 16 and main body 12 free from abrasion.

Further, by fitting a buffer made of a resin into the U-shaped hole 83 of said nozzle attaching body 16 on the open end side thereof, it is possible to absorb the impact energy produced with said ball, and thus said effect is more improved.

The buffer 29A may be fitted on the inner side of the main body 12 where the most of the force exerting on the ball is centrifugal force for the impact energy, it is, however, more preferable to fit said buffer 29A into the nozzle attaching body 16 where the energy owing to the relative speed between the nozzle attaching body 16 and the main body 12 is added, and hence, to intensify the impact energy.

To form said ball 81 to be made of a ceramic material results in decreasing the rotation suppressing force, because of decreasing the weight relative to that of steel. By forming a plurality of said rotation suppressing means in stages coaxially with the axis, it is possible to suppress the rotational force when acting simultaneously or with a brief time lag to improve the effect.

The invention relates to an improvement in the second invention, particularly in the rotating nozzle apparatus disclosed in FIG. 9, and as shown in FIGS. 10 and 11 is a rotating nozzle apparatus comprising a main body 20, a support 16 to which a rectilinear propagation nozzle 7 is attached, and cylindrical covers 24, 35 preferably made of a resin that are fixed to the upper surface of said support 16 to cover the upper surface of said support 16 and the outer circumferential surface of said main body 20, wherein (1) (resin) skirts 27, 38 fixed to the side of the main body 12 are fitted to the lower sides of the covers 24, 35, (2) the fitting surfaces between the cover 24 and the skirt 27, and if necessary the fitting surfaces of the cover 24 and the main body 12 are faced to each other with a screw thread 26 between them that extends in the same direction as the direction of the rotation of the support 16, which screw thread 26 is threaded to be loosened relatively to other threaded section since said support 16 is generally rotated in the direction in which the thread is fastened, instead of said screw thread 26, the fitting section of the cover 35 and the skirt 38 may be made in the form of a set or sets of labyrinths 35c-36b, and preferably the covers 24, 35 and the skirts 27, 38 are made of a resin, and (3) outlet side openings 28, 38a of the fitting sections are not formed on the lower sides contacting with the ground but positioned on the outer circumferential sides of the covers 24, 25.

Now, the order of the discharge of a leaking liquid from the bearing section 5 bearing rotatably said nozzle attaching body 16 and the main body 12 will now be described. The leaking liquid leaked from the bearing section 5 is transferred through a slide space 21 between the inner circumferential surface of the main body 12 and the nozzle attaching body 16 to the inner circumferential surface of the covers 24, 35, and is passed through the fitting surfaces of the skirts 27, 38 and the covers 24, 35 by using the centrifugal force of the covers 24, 35 gradually to flow out from the outlet openings 28, 38a positioned on the outer circumferential surface sides of the covers 24, 35. At that time, since a liquid outflow restricting means formed by the labyrinths 35c, 38b or the screw thread 26A is placed in said space, the outflow of the leaking liquid is restricted and is made slow, and therefore the fitting surfaces 35c-38a are sealed substantially with the leaking liquid interposed between the surfaces of the restricting means. As a result, if the highly pressurized water bounds at a considerable speed from the ground, and the bounded water containing mud strikes, the bounded water cannot enter the fitting surface 6.

Further, in the third invention, by fixing said skirts 27, 38 to the main body 20, the openings of the covers 24, 35 are not positioned on the lower surface side where the bound water is easily accessible directly but positioned on the outer circumferential surface sides of the covers 24, 35, so that the access of the bounded water can be obviated.

Since the positions where the screw thread 26A or the labyrinths 35c, 38b between said skirts 27A, 38 and the covers 24A, 35 are formed are placed quite near to each other, in some cases they may inadvertently be brought in contact with each other thereby forming for example drags, but both the members are made of a resin, the sliding resistance can be made small, and therefore if both the members come in contact with each other, drags or the like will not be formed.

BRIEF DESCRIPTION OF THE DRAWINGS

FIG. 1 shows the rotating nozzle apparatus embodying the present first invention, wherein (A) is a side view and (B) is a longitudinal front sectional view.

FIGS. 2 to 9 show the rotating nozzle apparatuses embodying the present second invention that will be built in the above washing apparatus; FIG. 2 shows the rotating nozzle apparatus using as brake means a U-shaped groove and a cylinder pair; FIG. 3 shows the rotating nozzle apparatus using as brake means a lining shoe; FIG. 4 shows the rotating nozzle apparatus using as brake means a turbine brake mechanism; FIG. 5 shows the rotating nozzle apparatus using as brake means blades; FIG. 6 shows the rotating nozzle apparatus using as brake means the repulsing magnetic field of magnets; FIG. 7 shows the rotating nozzle apparatus using as brake means an escape valve; FIG. 8 shows the rotating nozzle apparatus using as brake means a wheel brake; and FIG. 9 shows the rotating nozzle apparatus using instead of a ball-and-roller bearing a lining seal material for the rotating support member of the rotor, wherein (A) is a plane view with parts broken away and (B) is a longitudinal front sectional view, in each of FIGS. 2 to 9.

FIGS. 10 and 11 show the rotating nozzle apparatuses embodying the present third invention; FIG. 10 (A) is a plane view with parts broken away, and FIG. 10 (B) is a longitudinal front sectional view. FIG. 11 is a longitudinal front sectional view showing the rotating nozzle apparatus of another embodiment.

EMBODIMENTS

Figure 7:
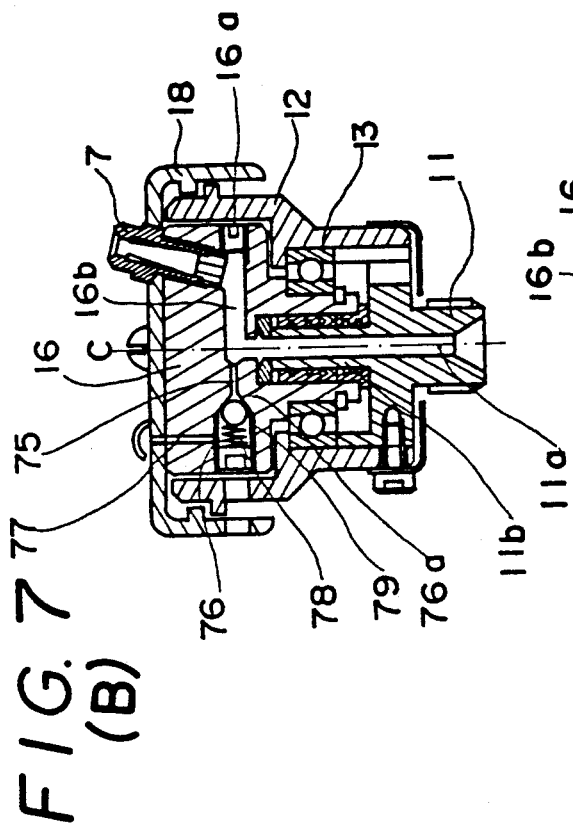

Now the present invention will be described illustratively using preferable embodiments of the present invention with reference to the drawings. Unless otherwise specified, the size, the material, the shape and the relative positions of the constitutional parts of the embodiments are not intended to limit the present invention, and they are simply mentioned for explanation.

FIG. 1 shows the rotating nozzle apparatus embodying the present first invention. In short, reference numeral 1 indicates the main body having an inflow port to which a pressure hose is threaded so that a highly pressurized fluid source can be flowed into the main body, and a packing seal 4 and the outer race 3a of a ball-and-roller bearing 3 including the bearing are fastened together by a sleeve 2 whose forward outer race side is threadably engaged.

The support 5 is forced into in the inner race of said ball-and-roller bearing 3 to be fixed therein, and is supported rotatably in the main body 1 through the ball-and-roller bearing 3, the support 5 has a fluid communicating space 5a open toward a main body inflow port 1a, possesses a pressure seal 4 in the base side cylindrical section thereby cutting off the inner space of the main body 1 between the ball-and-roller bearing 3 and said inflow port 1a, and also has through a hexagonal flange 5b on the side of the main body 1 a cylindrical body 5c whose upper part is opened and which has a gas thread on the outer circumference, and the cylindrical body 5c is substantially parallel to and offset from the rotation axis M (the axis of the ball-and-roller bearing 3) of the support 5.

As a result, the rotation axis M of the support 5 of the main body 1 and the cylindrical body axis C are offset as shown in FIG. 1 (A).

After a tape seal has been turned around the circumference of said cylindrical body, the nozzle attaching body 6 (hereinafter referred to as cap) in the shape of a cap is rotatably threaded.

To the cap 6 is threadably engaged the rectilinear propagation nozzle 7 having the rectifying piece 7a positioned on the inlet side, and the nozzle 7 is inclined and is extended in the direction of the axis C of the cap 6.

In the above constitution, for example, when the cap 6 is rotated on the support 5 through $\alpha$ (for example 130°) by a screw, the center 0 of the tip of the nozzle 7 is moved to 0'. If M is assumed to be the rotational center axis of the support 5, 0-M indicates the maximum offset, and 0'-M indicates the minimum offset. Thus, by rotating the cap 6 on the support 5, since the offset is varied, the rotational frequency and the jet area of the nozzle 7 rotated by the jet reaction can be controlled.

The rectifying piece 7a formed by bending and forming a metal thin plate into for example the shape of a star is inserted in the inlet of said nozzle 7.

The action of the rectifying piece 7a is for rectifying the highly pressurized water led to the nozzle inlet 7 and for jetting the water from the nozzle 7.

FIG. 2 shows the rotating nozzle apparatus embodying the second invention to be built in said washing apparatus, reference numeral 11 indicates the base having an inflow port 1a into which a pressure hose is threaded so that a highly pressurized fluid source can be flowed into the base, a cylindrical main body 12 having a cylindrical recess for housing a nozzle attaching body (hereinafter referred to as rotor 16) is threadably bonded to the upper surface side thereof, and the outer race 3a of the ball-and-roller bearing 13 is sandwiched between the lower inner circumferential section of the main body 12 and the upper surface of the base 11.

A guide section 16a of the rotor 16 is fitted through a liner packing 13 onto the outer circumference of a center pipe 11*b* having a center through-hole 11*a* of said base 11, the inner race 3*b* of the ball-and-roller bearing 13 is pressed and fixed onto the outer circumference of said guide section 16*b*, and as a result said rotor 16 is rotatably supported in the base 11 through the ball-and-roller bearing 3. In the figure, reference numeral 14 indicates an escape hole for the liquid leaked from the seal packing, etc., reference numeral 15 indicates a drain cover, and reference numeral 17 indicates a snap ring that functions as a stopper of the ball-and-roller bearing 13.

On the other hand, the upper section of the rotor 16 is formed to have an outer diameter a little larger than the cylindrical recess inner wall surface 12*a* of the main body 12, the rectilinear propagation nozzle 7 having the rectifying piece 7*a* is threaded to the upper surface thereof, and the nozzle 7 is inclined in the direction of the axis C of the rotor 16 and also is inclined circumferentially a little. A communication hole 16*b* is drilled in said rotor 16 so as to allow the rectilinear propagation nozzle 7 and the central communication through-hole 11*a* on the side of the base 11 to be in communication with each other. As a result, by introducing highly pressurized fluid into said center through-hole 11*a*, said rotor 16 is rotated by the jet pressure from the nozzle 7. Reference numeral 16*a* indicates a set-screw for sealing the communication hole 16*b*.

Said rotor 16 is formed with a plurality of U-shaped grooves 52 in the outer circumferential surface opposed to the housing 12 with a prescribed angle spaced between the U-shaped grooves 52, each cylindrical body 51 having the same diameter as that of the U-shaped grooves 52 is contained in each of the U-shaped grooves 52, an O-ring 54 surrounds the outer circumferential surface of said rotor 16 and ring grooves 53 formed in the circumferential surfaces of the cylindrical bodies 51, and said cylindrical bodies 51 are held to the U-shaped grooves 52 by a prescribed resilient force. As a result, when the rotor 16 is in the non-rotated state, the cylindrical bodies 51 can be kept in a state wherein they are not in contact with the inner wall surface 12*a* of the main body 12. A cap 18 in the shape of the letter C in cross section is attached to the upper surface side of the rotor 16 to conceal the U-shaped grooves 52. According to this embodiment, when the rotation is at rest, since the cylindrical bodies 51 retain the state wherein they are out of contact with the inner wall surface 12*a* of the main body 12, the rotor 16 is started easily to rotate by the jet reaction of the nozzle 7, said cylindrical bodies 51 are pressed to the inner wall surface 12*a* of the main body 12 against the resilient retaining force of the O-ring 54 by the centrifugal force generated by the rotation of said rotor 16, by the sliding resistance the rotation of the rotor 16 is suppressed, and the sliding resistance increases in proportion to the increase of the rotational frequency of the rotor 16, so that the rotational speed is suppressed, a centrifugal force high enough to cause the jet water stream to become spray would not be generated, and the rectilinear propagation property can be retained.

FIG. 3 shows another embodiment using a lining shoe, wherein the rotation suppressing means is made up of a lining shoe 56 overlapping the inner wall surface 12*a* of the main body 12 with the lining shoe 56 out of contact with the inner wall surface 12*a* and with the free end 56*a* folded once, a cylindrical body 57 to which the base side of said lining shoe 56 is fixed, and a cylindrical recess 58 formed in the outer circumferential surface of the rotor 16 for housing said cylindrical body 57.

According to this embodiment, when the rotation is at rest, the lining shoe 56 retains the noncontact state with the inner wall surface 12*a* of the main body 12, and even if the lining shoe 56 comes in contact slightly with the inner wall surface 12*a*, since the resistance of said lining shoe 56 is low, the rotor 16 is started to rotate easily by the jet reaction of said nozzle 7. Then, by the pressing force of the cylindrical body 57 due to the centrifugal force generated by the rotation of said rotor 16, said lining shoe 56 is forcibly brought in contact with the inner wall surface 12*a* of the main body 12, then the resulting sliding resistance suppresses the rotation of the rotor 16, and since said sliding resistance increases in proportion to the increase in the rotational frequency of said rotor 16, the rotational speed is suppressed, creating an effect similar to the above effect.

FIG. 4 is another embodiment using a turbine brake mechanism, wherein the center pipe 11*b* of the rotor 16 is extended to the inner wall surface 12*a* of the main body 12, a disk member 60 having slide pieces 61 whose forward end is divergently bifurcated and which are located at the extended part of the center pipe 11*b*, weights 63 are attached to the ends of each slide piece 61, and the action of the centrifugal force of said weights 63 causes the slide pieces 61 to close. On the other hand, a plurality of semispherical friction balls 62 are arranged radially on the side of the inner wall surface 12*a* of the main body 12 and are faced to the slide pieces 61.

According to this embodiment, when the rotation is at rest, since the semispherical friction balls 62 and the slide pieces 61 retain the noncontact state, the jet reaction of the nozzle 7 starts the rotation of the rotor 16 easily, and the centrifugal force produced by the rotation of the rotor 16 causes the divergently bifurcated slide pieces 61 to close, so that the slide pieces 61 slide on the friction balls 62. Therefore, the sliding resistance suppresses the rotation of the rotor 16, and since said sliding resistance increases in proportion to the increase in the rotational frequency of said rotor 16, the rotational speed is suppressed, creating an effect similar to the above effect.

FIG. 5 shows another embodiment using blades 66, wherein a plurality of vertical shafts 67 are arranged radially and circumferentially on the outer circumferential surface of the cap 18 that is rotated integrally with the rotor 16, and the blades 66 are attached to said shafts 67 by screws.

Each blade 66 is made of a stainless steel plate, and is extended along the outer circumferential surface of the cap 18, and the free end 66*a* of each of the blades 66 is turned to form a pressure receiving surface 66*b*.

According to this embodiment, when the rotation is at rest, since the free end of each blade 66 is turned 180° to overlap, the pressure receiving area is little. Therefore in this state, the rotor 16 is started to rotate by the jet reaction of said nozzle, then by the rotation wind force and the centrifugal force generated by the rotation of said rotor 16 the free ends of the blades 66 that are turned 180° to overlap are raised radially against the resiliency of the blades 66 themselves, and the wind force resistance suppresses the rotation of the rotor 16. In proportion to the increase in the rotational frequency of the rotor 16, the pressure receiving area of said free end 66*a* increases and the wind force resistance increases. As a result, the rotational speed is suppressed, creating an effect similar to the above effect.

FIG. 6 shows another embodiment using the repulsing magnetic field of magnets, wherein a plurality of magnet bodies 71-72 of the same pole are arranged in the inner wall surface 12a of the main body and on the outer circumferential surface of the rotor 16 at opposed positions. According to this embodiment, when the rotation is at rest, said magnet bodies 71-72 are positioned diametrically furthest from each other due to the repulsing magnetic field of the magnet bodies 71-72, therefore since in this state the influence of the magnetic field can almost be ignored, the jet reaction of the nozzle 7 can start the rotor 16 easily, and after the start, when the magnet bodies 71-72 are positioned to oppose to each other, the rotational force is suppressed. As the rotational speed increases, the opposed number increases proportionally, and as a result the rotational speed is suppressed proportionally. Therefore, a centrifugal force high enough to cause the jet water stream to become spray is not generated, and the rectilinear propagation property can be retained.

FIG. 7 shows another embodiment using an escape valve, wherein a small hole 75 in communication with the communication hole 16 in the rotor 16 for introducing said highly pressurized fluid to the nozzle 7 is drilled with it radially directed from the central position, an escape hole 77 is located on the outlet side of a closed space 76, which is in communication with the outlet side of the escape hole 77 through a tapered seat surface 76a, and is extended vertically into the upper surface position, a steel ball 79 is contained in said space 76 with the steel ball 79 energized resiliently in the direction opposite to the direction of the centrifugal force, and said steel ball 79 is abutted against said seat surface 76a and is sealed to cut off the communication between said small hole 75 and the escape hole 77.

According to this embodiment, when the rotation is at rest, since the rotor 16 retains the noncontact state with the inner wall surface 12a of the housing 12, the jet reaction of said nozzle 7 starts the rotation of the rotor 16 easily, and the centrifugal force generated by the rotation of said rotor 16 acts on said steel ball 79. When the rotational speed becomes larger than the pressure of the spring 78, the steel ball 79 is spaced slightly from the seat surface 76a, and a part of the highly pressurized fluid flowing in the communication hole 16b escapes outside through the small hole 75 from the escape hole 77. The drop in the fluid pressure suppresses the rotation of the rotor 16, and as the rotational frequency of said rotor 16 increases, the distance of the space between said steel ball 79 and said seat surface 76a increases proportionally. As a result, the escaping amount of said fluid increases further thereby suppressing the rotational frequency, and an effect similar to the above effect can be exhibited.

Figure 8:
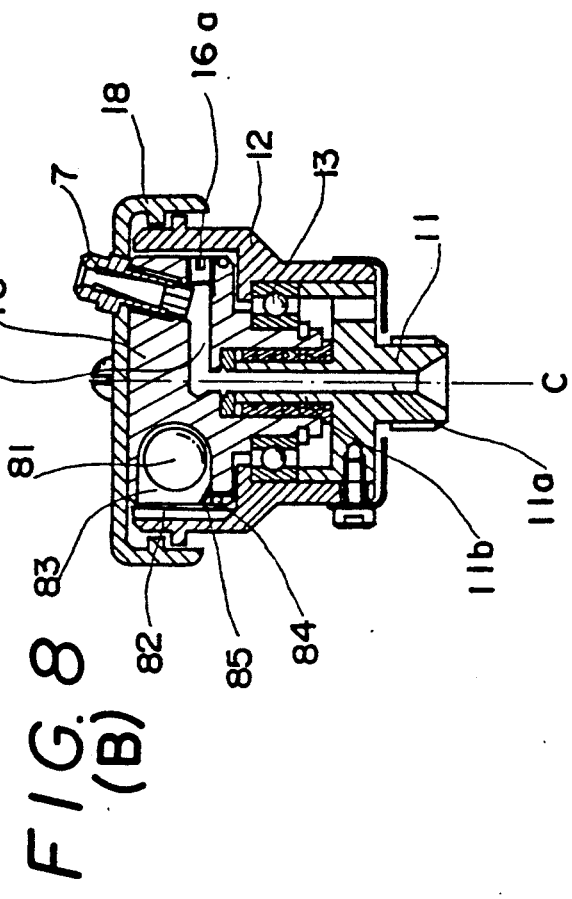
Figure 7:
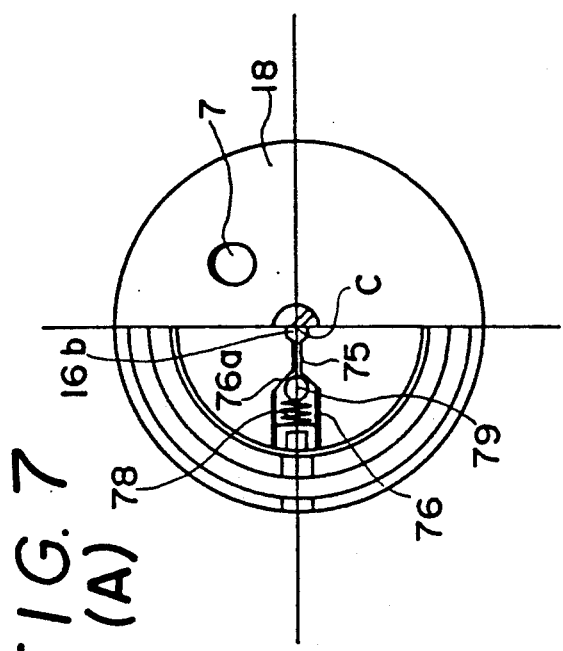
Figure 8:
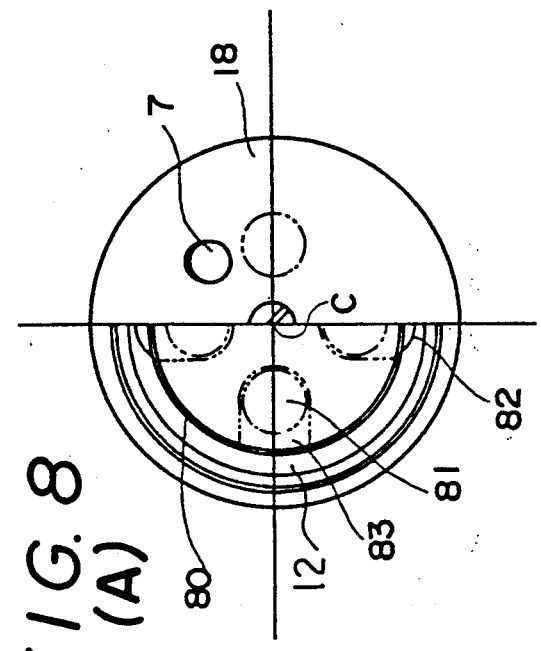

FIG. 8 shows another embodiment using a wheel brake, wherein four steel ball holding holes 83 are formed in the outer circumferential surface of the rotor 16 with them spaced 90 degrees radially and circumferentially from each other, each steel ball 81 that is slightly smaller than the holding hole 83 is held in each holding hole 83, each stopper 85 is attached to the outer circumferential end of each holding hole 83 to prevent the steel ball 81 from being dislodged, and an O-ring surrounds the lower outer circumferential surface to facilitate the rotation of the rotor 16. On the other hand, one or two shallow arcuate grooves 82 (in this embodiment, there are two shallow arcuate grooves 82 spaced 180 degrees from each other) are selectively positioned to face said steel balls 81 on the side of the inner wall surface 12a of the housing 12, and said steel balls 81 are allowed to engage with said grooves 82.

According to this embodiment, when the rotation is at rest, since the steel balls 81 retain the noncontact state with the inner wall surface 12a of the main body 12, the jet reaction of said nozzle 7 starts the rotation of the rotor 16 easily, the centrifugal force generated by the rotation of said nozzle 16 moves the steel balls 81 outward of the holding holes 83, and part of each steel ball 81 is projected from the holding hole 83 to engage with said groove 82 and then to be disengaged by the rotation of the rotor 16. Thus the repeated engagement and disengagement of the steel balls 81 suppress the rotation of the rotor 16, and as the rotational frequency of said rotor 16 increases, the centrifugal force increases proportionally, and the pressing force energized against said steel balls 81 increases, so that the engaging strength between said steel balls 81 and the grooves 82 increases and as a result the rotational speed is suppressed, thereby creating an effect similar to the above effect.

Reference symbol 11c indicates a hole for making the center through-hole 11a in communication with the communication hole 16b of the rotor 16.

Figure 9A:
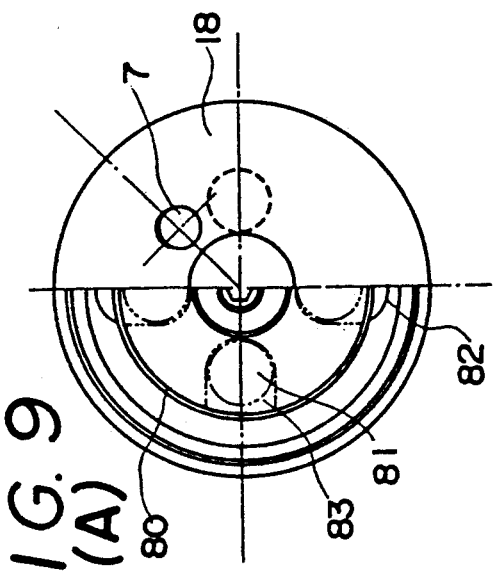
Figure 9B:
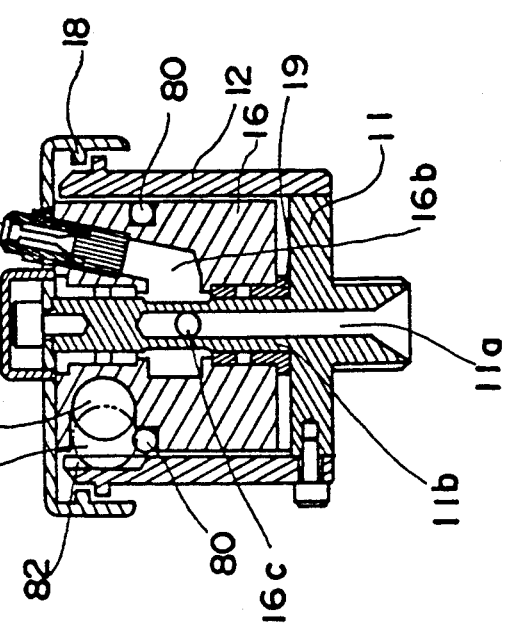

FIG. 9 shows another embodiment wherein the rotor 16 is supported rotatably to the base 11 by a lining seal medium 19 without using the ball-and-rolling bearing 13, wherein similarly to the embodiment shown in FIG. 8 a plurality of steel ball holding holes 83 are formed in the outer circumferential surface of the rotor 16, a little small steel balls 81 are held in said holding holes 83, and an O-ring 86 is arranged to surround the outer periphery to facilitate the rotation of the rotor 16 and also to serve as a stopper for preventing the steel balls from being dislodged.

On the other hand, shallow arcuate grooves 82 are arranged on the side of inner wall surface 12a of the main body 12, and are allowed to serve as rotation suppressing means in such a way that said steel balls 81 can engage with the grooves 82. The operation of this embodiment is similar to that of FIG. 10.

Figure 10A:
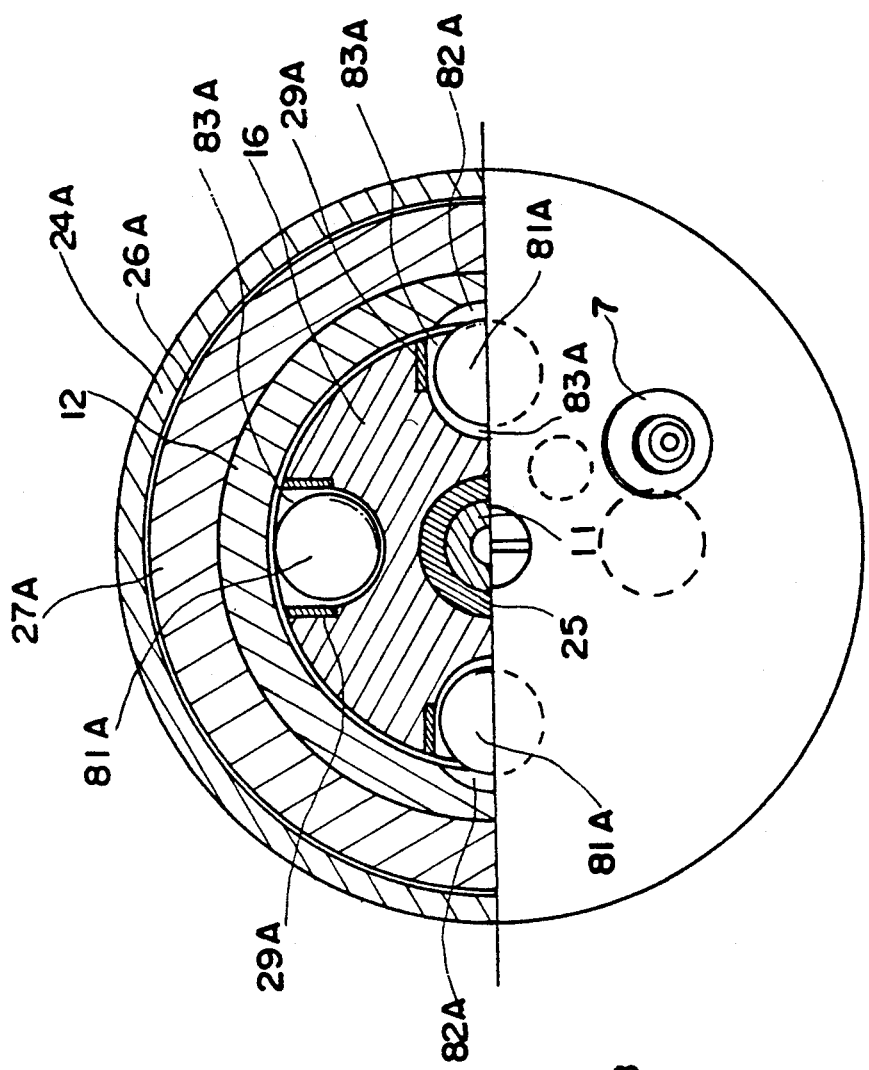

FIG. 10 shows a rotating nozzle apparatus embodying the third invention, which relates to an improvement in the rotating nozzle apparatus shown in FIG. 9.

The base 11 is provided, on the lower side of the base 11 having a center through-hole 11a, with a screw section 11c with which a pressure hose will threadably be engaged, a disk-like flange section 11d is provided on the upper side of said screw section 11c, and a cylindrical main body 12 is threadably attached to the outer circumference of said flange 11d, so that a cylindrical recess can be formed on the upper side thereof for housing the rotor 16.

Over the base 11 stood from said flange 11d, a cylindrical rotor 16 is supported rotatably to the base 11 through a pair of liner seals 19, 25.

On the other hand, the rotor 16 is formed into a cylinder having an outer diameter slightly smaller than the inner wall surface of the main body 12, a cylindrical cover 24A in a C-shaped in cross section is attached concentrically on the upper surface thereof, and they are integrally fixed through the rectilinear propagation nozzle 7, if required, via a screw.

The rectilinear propagation nozzle 7 is slanted to be directed to the axis O of the rotor 16 and is slanted slightly radially and circumferentially, and a communication hole 16b is drilled in said rotor 16 so that the center through-hole 11a on the side of said base 11 and the rectilinear propagation nozzle 7 are in communication with each other. As a result, when a highly pressurized fluid is introduced into the center through-hole 11a, said rotor 16 is rotated by the jet pressure from the nozzle 7.

Said rotor 16 is formed, on the outer circumferential surface opposite to the main body 12, with a plurality of upper and lower U-shaped holes 83A, 83B spaced a prescribed angle radially and circumferentially, and bushings 29A, 29B are fitted into said U-shaped holes 83A, 83B on the open end sides thereof. Ceramic balls 81A, 81B having a diameter slightly smaller than that of said U-shaped holes 83A, 83B are housed in said U-shaped holes 83A, 83B respectively.

On the other hand, one or two shallow arcuate grooves 82A, 82B (in this embodiment, there are two shallow arcuate grooves 82A and 82B spaced 180 degrees from each other) are selectively positioned to face said ceramic balls 81A, 81B on the side of the inner wall surface of the main body 12, and said ceramic balls 81A, 82B are allowed to engage with said grooves 82A, 82B.

According to this embodiment, when the rotation is at rest, since the ceramic balls 81A, 81B retain the non-contact state with the inner wall surface of the main body 12, the jet reaction of said nozzle 7 starts the rotation of the rotor 16 easily. Then the centrifugal force generated by the rotation of said rotor 16 moves the ceramic balls 81A, 81B outward of the U-shaped holes 83A, 83B, and part of said ceramic balls 81A, 81B are projected from the U-shaped holes 83A, 83B to engage with said grooves 82A, 82B and then are disengaged by the rotation of the rotor 16, so that the repeated engagement and disengagement of said ceramic balls 81A, 81B suppresses the rotation of the rotor 16. When the centrifugal force is increased proportionally to the increase in the rotational frequency of said rotor 16, since the pressing force energized to said ceramic balls 81A, 81B increases, the strength of the engagement between said ceramic balls 81A, 81B and the grooves 82A, 82B increases, and as a result the rotational speed is suppressed.

The cover 24A fixed to said rotor 16 has an inner diameter slightly larger than the main body 12, its cylindrical section depends so that it may be opposite to the circumferential surface of the main body 12, its inner circumferential surface lower side is tapered, and a thin thread 26A is formed thereon counterclockwise along the direction of the rotation.

On the other hand, on the side of said main body 12, a skirt 27A fixed to the main body 12 opposite to the lower side of the cover 24A is attached.

Part of the skirt 27A that is over the lower circumferential section having the same outer diameter as that of said cover 24A is whittled along the lower inner diameter of the cover 24A, and on the inner diameter side, a thread is formed fixably and vertically movably in the main body 12. In addition, the upper small-diameter section of the skirt 27A is formed to have such an outer diameter that it is substantially in contact with the thread 26.

The skirt 27A is threaded to the main body 12 in such a manner that the skirt 27A can be set with the outlet opening 28 between the skirt 27A and the lower end of the cover 24A being very small.

FIG. 11 shows a rotating nozzle apparatus embodying the present invention, and the differences thereof from the above embodiments will now be described mainly.

The cylindrical lower side of a cylindrical cover 35 is close to the circumferential surface of the main body 12 through a slanted step, the cylindrical cover 35 has a thick wall, the inner circumferential side of the thick-wall section 35a is formed with a left handed female thread 35b, and the lower end surface is formed with a ringlike recess 35c rectangular in cross section.

On the other hand, the skirt 38 is an annular body having a thread 39 on the inner circumference, the outer diameter is set to be the same as the outer diameter of the cover 35, and the thread 39 is formed on the inner diameter side, and is provided fixably and vertically movably to the main body 12. On the upper surface of the annular body, a ringlike projection 38b is stood whose height is the same as that of the ringlike recess 35c and whose width is made slightly smaller than that of the ringlike recess 35C.

The skirt 38 allows said ringlike projection 38b to be fitted into the recess 35c with a small space between them. Thus, the fitted section can take a form of a labyrinth, and the outlet opening 38a is positioned on the outer circumferential surface side of the cover 35, thereby attaining the operation of the present invention as described above.

Similarly, the female thread 35b is opposite to the main body 12, and as a result two liquid outflow restricting means are preferably formed.

What is claimed is:

1. A rotating nozzle apparatus, which comprises a substantially cylindrical support supported rotatably on a main body connected to a pressure source, a nozzle attaching body engaged with said support rotatably along an axis substantially parallel to and offset from the rotation axis of said support, the rotation axis of said support being substantially parallel to the longitudinal axis of said support, and a rectilinear propagation nozzle fixed to said attaching body such that the distance between said nozzle and the rotation axis of said support can be adjusted by rotating said attaching body relative to said support, said nozzle being inclined at a prescribed angle so that jet pressure from said nozzle causes said nozzle attaching body to rotate about the rotation axis of said support, and the rotation resistance between the nozzle attaching body and the support being set high enough so that the position of said nozzle attaching body can be retained against the centrifugal force generated when said nozzle attaching body is rotated about the rotation axis of said support such that distance between said nozzle and the rotation axis of said support remains constant.

2. The rotating nozzle apparatus as claimed in claim 1, wherein said support is supported to the main body through a ball-and-roller bearing, and said nozzle attaching body is engaged with the support through a threaded section.

3. The rotating nozzle apparatus as claimed in claim 1, wherein a rectifying piece is attached on the inlet side of said rectilinear propagation nozzle.

* * * * *